Oct. 7, 1924.
E. B. STIMPSON
RIVET
Filed Aug. 20, 1921
1,510,713
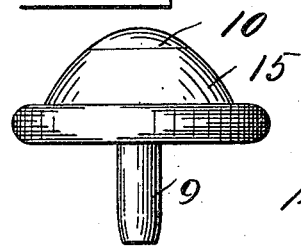
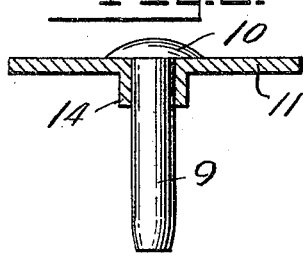
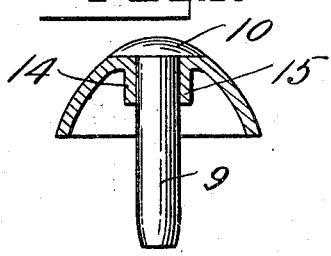
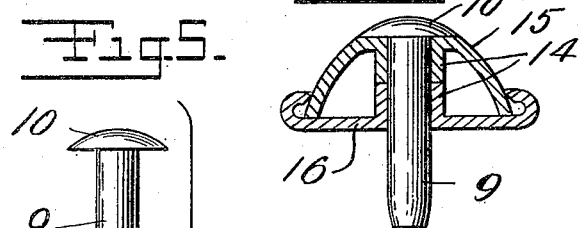
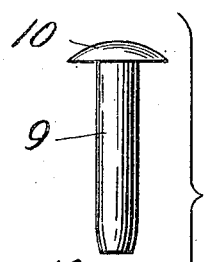
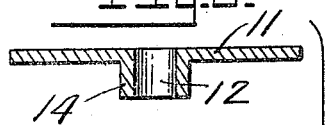
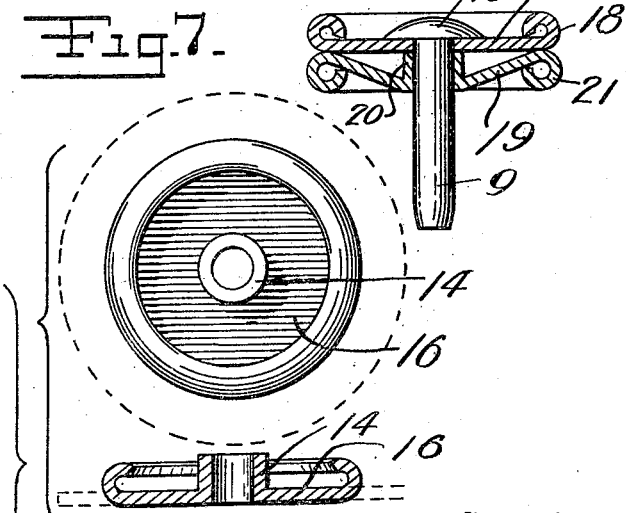
Inventor
Edwin B. Stimpson
By his Attorney
Frank A Kent Patented Oct. 7, 1924.

1,510,713

UNITED STATES PATENT OFFICE.

EDWIN B. STIMPSON, OF BROOKLYN, NEW YORK, ASSIGNOR TO EDWIN B. STIMPSON COMPANY, OF BROOKLYN, NEW YORK.

RIVET.

Application filed August 20, 1921. Serial No. 493,885.

*To all whom it may concern:*

Be it known that I, EDWIN B. STIMPSON, a citizen of the United States, residing at Brooklyn, in the county of Kings and State of New York, have invented certain new and useful Improvements in Rivets, of which the following is a specification.

This invention relates to a new and improved form of rivet.

It has heretofore been proposed to make rivets with large or ornamental heads by providing separate shanks and heads, passing the shank through the head, and holding the parts in assembled relation by providing offset or upset portions on the shank on opposite sides of the head, whereby the head is held on the shank. Certain mechanical difficulties are involved in this method of manufacture, and assembly is not simple; furthermore the resulting rivet is in many cases unsatisfactory because the parts are not immovably joined.

It is an object of my invention accordingly, to provide a two-part rivet in which the head and shank are initially separate pieces, the shank having an enlarged upper end and the head proper having a central tubular aperture with the shank passing through the aperture, its enlarged end resting against the head, and being in effect a part thereof, and the shank fitting the tubular aperture of the head so tightly that it is substantially immovable therein under ordinary conditions of use. This last result is attributed not only to the tight fit of the shank and to the increased frictional grip due to the relatively considerable contact surface of the tubular part of the head, but also to the fact that the construction eliminates possibility of relative rocking or tilting movement of the parts.

As will be seen, from the drawings, the construction is adapted to the production of ornamentally headed rivets in endless design.

Other objects and aims of the invention, more or less broad than those stated above, will be in part obvious and in part specifically referred to in the course of the following description of the elements, combinations, arrangements of parts, and applications of principles set forth in the following description; and the scope of protection contemplated will appear from the claims.

In the accompanying drawings, in which I have shown forms of embodiment of the invention as at present preferred, Figure 1 illustrates a mushroom beaded head rivet made in accordance with my invention; Figure 2 is a vertical sectional view of the same, with the shank in elevation; Figure 3 is a view of a simple form of rivet made by my invention, with the shank in position within the tubular aperture of a generally flat head part, the head part being in section and the shank in elevation; Figure 4 is a view similar to Figure 3, but with the head part brought to mushroom form; Figure 5 includes, collectively, illustrations of the shank in elevation and end view; Figure 6 includes, collectively, illustrations of the head part in section and bottom plan; Figure 7 includes, collectively, illustrations in plan and section of a beaded head part such as is illustrated in Figure 1; and Figure 8 is a sectional view of a modified form of rivet embodying my invention.

Referring to the numerals on the drawings, there is shown at 9 the shank part of a rivet, having at one end an enlargement 10, the other end being the part which penetrates the material in which the rivet is secured. The shank may be solid or bifurcated or tubular or of other character. The head part (Figures 3 and 6) may be initially a generally flat disk 11, having a central aperture 12, defined by a tubular extension 14, having an internal diameter such that the shank part 9 may be driven into it with a very tight fit, the enlargement 10 of the shank contacting with the upper surface of disk 11. If the enlargement 10 be rounded on its upper surface as shown, the head part 11 may be bent to the mushroom form shown in Figure 4, and indicated by numeral 15, so that the enlargement 10 and the head 15 partake of the same general curvature. Of course, the enlargement 10 and the head part 11 may be given any desired shape, either initially or in the process of assembly, the essential features being the enlargement of the upper end of the shank and the provision of the tubular extension 14 which holds the shank with a strong frictional grip and prevents relative tilting or rocking of the parts because it is longer than the thickness of the disk proper.

In Figure 2 there is shown a shank 9 and head part 15, as in Figure 4, and an additional head part 16 provided also with a tubular extension 14 closely gripping the shank in the same way as the extension 14 of the head part 15, the two tubular parts 14 extending towards and abutting against each other. Preferably also the outer edge of the head part 16 is beaded upwardly around the lower edge of the head part 15, disk 16 being preferably initially flat, as indicated by dotted lines in Figure 7, and the edge portions subsequently turned in to the full line position of Figures 1, 2 and 7. In this form of the device the tubular extension 14 of the head part 16 might be made longer, and the extension 14 of the head part 15 dispensed with, since the frictional grip of the former on the shank would be sufficient to hold the parts firmly together. I prefer, however, that each head part or disk shall have the tubular frictional gripping extension, so that the parts are uniform and may be interchangeably used.

In Figure 8 I show an upper head part 17 which is not provided with any tubular extension, but has merely an aperture through which the shank passes, and the edge of this disk is turned upwardly and inwardly, as indicated at 18, forming a bead. And there is a second head part 19, having a tubular gripping part 20 extending upwardly surrounding the shank and abutting against the disk 17, member 20 having its edge bent downwardly and inwardly to form a bead 21.

It will be understood that the parts of the rivet will be made of any metal suitable for the purposes for which rivets are ordinarily employed, and that I contemplate no limitations upon the scope of my invention or of the protection herein sought, except such as are demanded by the reasonable interpretation of the following claims, and the state of the prior art.

I claim:

1. A rivet including a shank part with an enlarged upper end, and a head part having an aperture therethrough and an integral downwardly projecting tubular extension whose bore is throughout of uniform cross section and continuous with the walls of the aperture, the shank having a driven fit in the aperture and tubular extension, and the enlargement of the shank resting upon the top of the head part.

2. A rivet including a shank part with an enlarged upper end, and a head part having an aperture therethrough defined by a tubular extension surrounding and tightly gripping the shank part, the enlargement of the shank resting upon the head part, and a second head part through which the shank passes and having an edge part which is interengaged with the first head part.

3. A rivet comprising a shank part with an enlarged upper end, a mushroom head part having a central tubular part surrounding and tightly gripping the shank and contacting with the enlargement of the shank, and a disk head part through which the shank passes and which has an edge beaded around the edge of the mushroom head part.

4. A rivet comprising a shank part with an enlarged upper end curved on its outer surface, and a mushroom head part having a central tubular part surrounding and tightly gripping the shank and contacting with the inner surface of the shank enlargement, the outer surfaces of the shank enlargement and of the mushroom head partaking of the same general curvature.

In testimony whereof I affix my signature.

EDWIN B. STIMPSON.